United States Patent [19]
Harrell

[11] Patent Number: 5,400,859
[45] Date of Patent: * Mar. 28, 1995

[54] BIDIRECTIONAL PLOW WITH ROTATABLE TOOL BAR

[76] Inventor: Danny H. Harrell, Rte. 3, Camilla, Ga. 31779

[ * ] Notice: The portion of the term of this patent subsequent to Dec. 7, 2010 has been disclaimed.

[21] Appl. No.: 77,461

[22] Filed: Jun. 15, 1993

Related U.S. Application Data

[63] Continuation of Ser. No. 774,453, Oct. 10, 1991, Pat. No. 5,267,618.

[51] Int. Cl.⁶ .............................................. A01B 3/28
[52] U.S. Cl. ................................... 172/219; 172/204
[58] Field of Search ............... 172/215, 219, 225, 200, 172/204–212, 161, 712

[56] References Cited

U.S. PATENT DOCUMENTS

| | | | |
|---|---|---|---|
| 2,578,942 | 12/1951 | Onfrey | 172/219 X |
| 2,764,075 | 9/1956 | Fowler | 172/211 |
| 3,115,191 | 12/1963 | Ward | 172/219 X |
| 3,186,496 | 6/1965 | Cox et al. | 172/211 |
| 5,024,281 | 6/1991 | Furlough | 172/219 |

FOREIGN PATENT DOCUMENTS

| | | | |
|---|---|---|---|
| 2390079 | 1/1979 | France | 172/219 |
| 194482 | 4/1907 | Germany | 172/219 |
| 178786 | 4/1922 | United Kingdom | 172/219 |

*Primary Examiner*—Dennis L. Taylor
*Assistant Examiner*—Spencer Warnick
*Attorney, Agent, or Firm*—Hopkins & Thomas

[57] ABSTRACT

A main frame is secured to a tractor for towing wherein the main frame is tilted as the tractor tilts to one side or the other of the path of travel. A ball and socket joint suspends the tool bar by its central portion from the main frame so that the tool bar can swing from a position angling forwardly and to one side to a second position angling forwardly and to the other side. The moldboards being fixed to an suspended below the tool bar cause the tool bar to rotate about its longitudinal axis automatically swing by gravity to upright positions for plowing, regardless of the tilt of the main frame. A latch plate latches the tool bar in its rotated position on the frame. The tool moldboards have clamps which are adjustable along the length of the tool bar for adapting the plow to wide wheel or narrow wheel base tractors.

8 Claims, 8 Drawing Sheets

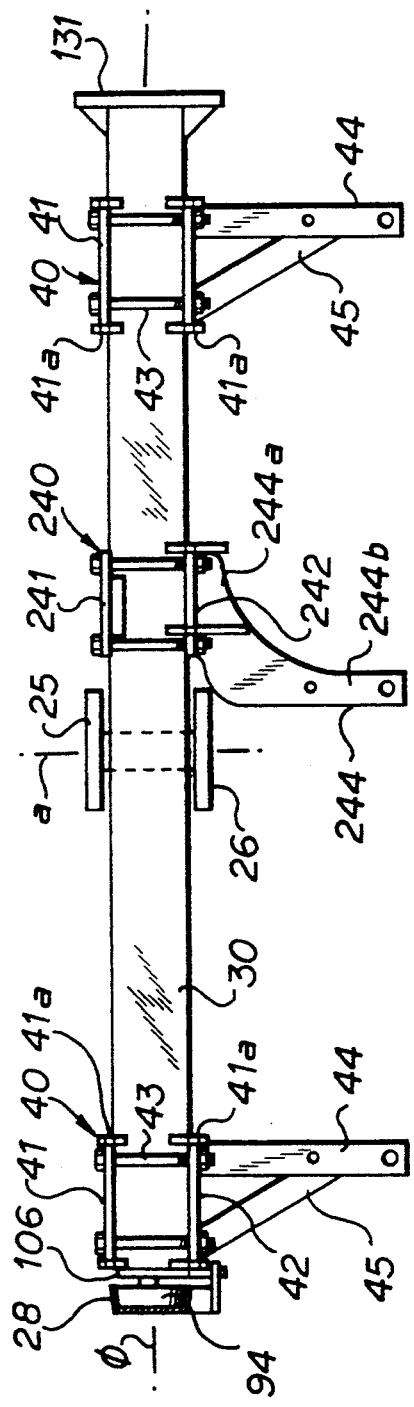
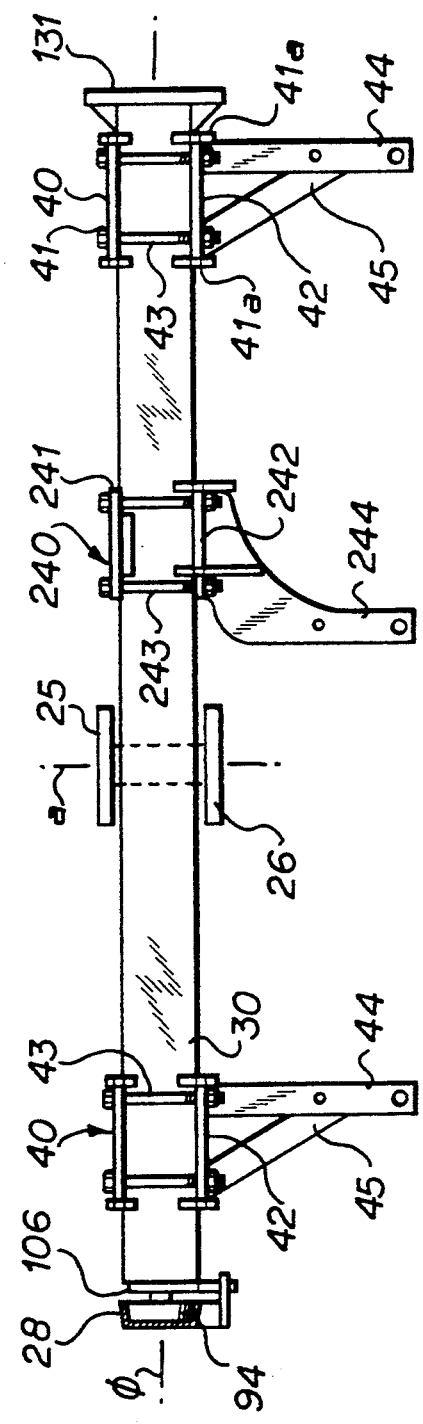

BIDIRECTIONAL PLOW WITH ROTATABLE TOOL BAR

This is a continuation of application Ser. No. 07/744,453, filed on Oct. 10, 1991, now U.S. Pat. No. 5,267,618.

FIELD OF THE INVENTION

This invention relates to bidirectional in furrow plows and is more particularly concerned with a bidirectional in furrow plow in which the tool bar is automatically rotatable about its longitudinal axis to maintain the proper positions for the moldboards.

BACKGROUND OF THE INVENTION

In the past, bidirectional in the furrow plows have been developed. Usually such bidirectional plows have required a tilting mechanism which tilts the main frame of the plow to a horizontal position when the tractor is plowing with one wheel in the furrow. The present invention eliminates the need for tilting the main frame and, instead, simply rotates by gravity the tool bar, itself, to thereby simultaneously tilt the moldboards, which are suspended from the tool bar to a horizontal working position and the force of the earth against the moldboards seats the tool bar and moldboards in a working position.

BRIEF DESCRIPTION OF THE INVENTION

Briefly described, the present invention includes a main frame with a three point hitch on front of the frame so that the frame is maintained in a position parallel to the axis of the rear wheels of the tractor. The three point hitch also provides for the main frame to be lifted in a conventional way, when an end of the row is reached. Suspended by a ball and socket on the main frame is a tool bar, the forward end portion of which is provided with a guide wheel which rides in an arcuate guide track within the main frame so as to guide the forward end portion of the tool bar in its swing from left to right and vice-versa. A plurality of longitudinally adjustable, rotationally fixed moldboard assemblies are suspended at spaced intervals along the tool bar on both sides of the ball and socket. A hydraulic cylinder actuates the swing of the tool bar about generally a vertical axis from left to right. The ball and socket permit rotation of the tool bar about its longitudinal axis. Detents at the extremities of the swing of the tool bar automatically latch the tool bar in its respective right hand or left hand position.

Below the ball and socket and below the tool bar, there is provided a tilt arresting assembly which includes a triangular opening. A bevelled bearing wheel on a main shaft protrudes from the tool bar rides within the opening, and arrests the extent of swing of the tool bar and the moldboards, so that the moldboards remain upright. Thus gravity arranges the moldboards for cutting in positions parallel to the earth, even though the tractor and main frame are in tilted positions.

Accordingly, it is an object of the present invention to provide a bidirectional moldboard which will automatically arrange the moldboards upright for cutting in horizontal paths, when the tractor has one wheel in the furrow and will automatically shift the position of the moldboards with respect to the main frame so that the moldboards continue in their upright positions, even though the tool bar has been shifted from one angular position to the other and the main frame is tilted to the left or to the right.

Another object of the present invention is to provide a bidirectional in furrow plow which is inexpensive to manufacture, durable in structure, and efficient in operation.

Another object of the present invention is to provide a bidirectional in furrow moldboard plow in which the tool bar thereof is automatically rotated about its axis for maintaining the moldboards in a horizontal position, regardless of whether or not the main frame of the plow is tilted to one side or the other.

Another object of the present invention is to provide a bidirectional in furrow plow which has fewer parts than conventional plows of this type.

Another object of the present invention is to provide a bidirectional in furrow plow in which it is not necessary to tilt the main frame of the plow in order to position the moldboards for moving in paths essentially horizontal with respect to the ground.

Another object of the present invention is to provide a bidirectional in furrow plow in which the parts thereof are readily replaceable.

Another object of the present invention is to provide a bidirectional in furrow plow which requires no adjustment in order to maintain the appropriate tilting of the moldboards when the tool bar has been shifted from one angular position to the other.

Another object of the present invention is to provide a bidirectional in furrow plow in which the amount of tilting of the tool bar which carries the moldboards can be varied for permitting the tractor wheel to travel at different depths while maintaining the moldboards in their horizontal position with respect to the ground.

Another object of the present invention is to provide, in a bidirectional moldboard plow, a tool bar which pivots about both an upright axis and a longitudinal axis.

Another object of the present invention is to provide, in a bidirectional plow, a detent for automatically latching the tool bar in each of its two extreme angular positions and for automatically releasing the tool bar for swing action when the main frame is lifted.

Another object of the present invention is to provide a process of automatically positioning moldboards of a plow in an upright position for plowing action, regardless of whether or not the main frame of the plow is tilted to one side or the other.

Another object of the present invention is to provide a process for automatically positioning the moldboards of the bidirectional plow in an upright position when the main frame of the plow is tilted, without the aid of hydraulic power and without manual manipulation of the parts of the plow.

Another object of the present invention is to provide a bidirectional plow and process for positioning moldboards in an upright position, utilizing gravity and the forward motion of the plow for properly positioning the moldboards and maintaining them upright.

Another object of the present invention is to provide a bidirectional moldboard plow which can be adjusted for towing by tractor with different wheel spacing.

Other objects, features, and advantages of the present invention will become apparent from the following description when considered in conjunction with the accompanying drawings, wherein like characters of reference designate corresponding parts throughout the several views.

BRIEF DESCRIPTION OF THE DRAWINGS

FIG. 12A is a side elevational view of a portion of the plow depicted in FIG. 1 and showing primarily the tool bar and portions of the shank and clamp assemblies for the moldboards, the spacing of the moldboards being arranged for a tractor with a wide wheel base; and FIG. 12B is a view similar to FIG. 12A but showing the clamps and shanks of the moldboards in a rearwardly adjusted position for use with a tractor having a narrow wheel base.

DETAILED DESCRIPTION

Figure 1:
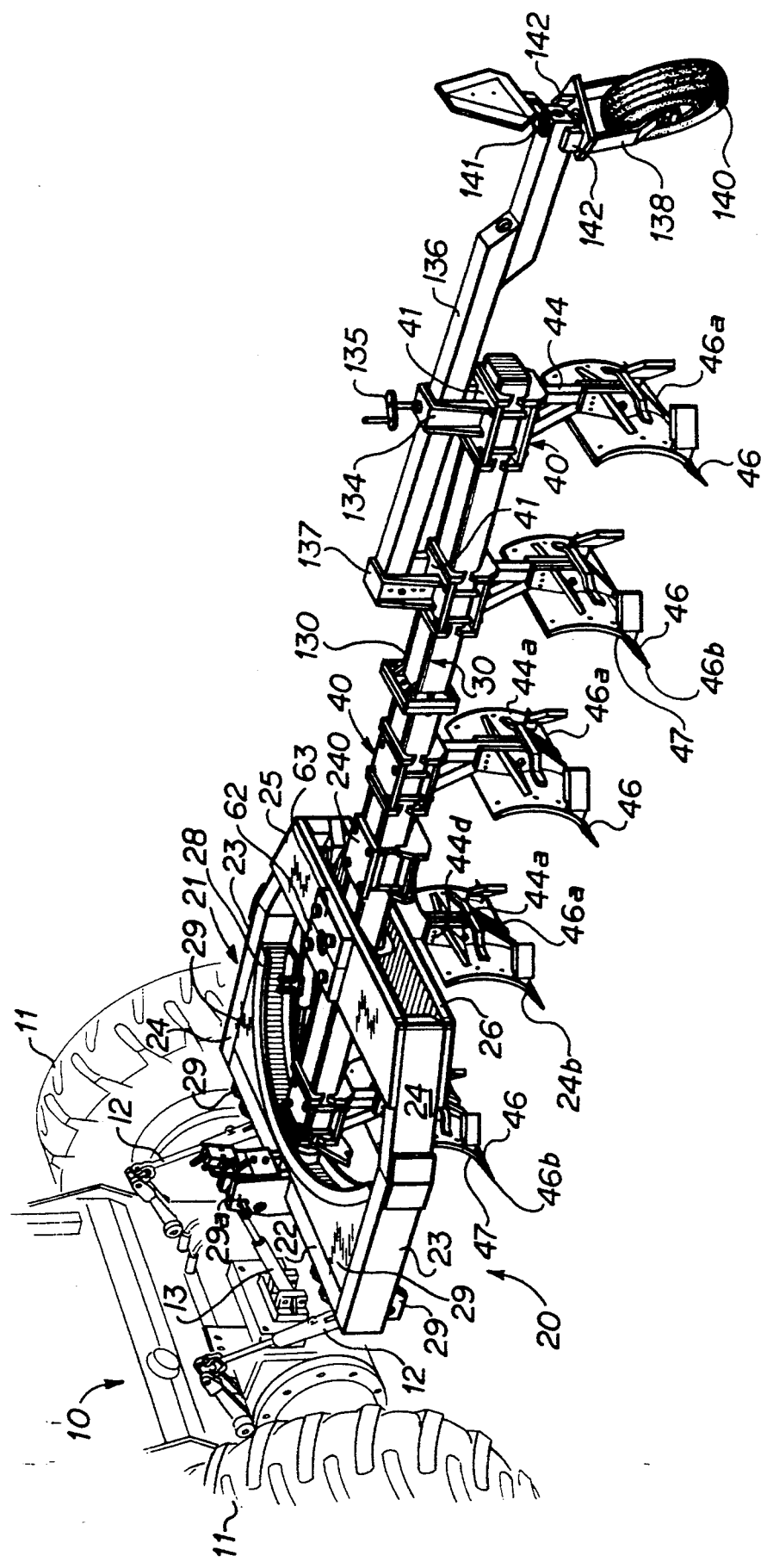
FIG. 1 is a perspective view of the bidirectional in the furrow plow constructed in accordance with the present invention, the plow being illustrated as connected to a conventional tractor for towing by the tractor.

Referring now in detail to the embodiment chosen for the purpose of illustrating the present invention, numeral 10 denotes generally a conventional tractor provided with rear wheels 11 which are opposed to each other and rotate about a common transverse axis. The tractor 10 is also provided with a pair of opposed side hitch members 12 and a central hitch member 13.

The bidirectional in furrow moldboard plow of the present invention is denoted generally by the numeral 20. This plow 20 is provided with a main frame denoted generally by numeral 21. The main frame 21 includes a front transverse bar 22 and side bars 23. The side bars 23 are disposed longitudinally in spaced opposed relationship with their front end portions welded or otherwise connected to the end portions of the front bar 22. The rear ends of the side bars 23 are provided with opposed rearwardly tapering side bar extensions 24.

In FIG. 1, side hitches 29 and central upstanding hitch 29a are provided fixed to the front bar 22 for being connected to the hitches 12 and 13 of the tractor. When the side hitches 29 are appropriately connected to the side hitches 12 of the tractor, the front cross bar 22 of the main frame 20 is held, in place, parallel to the axle or axis of tractor 10.

At the rear end portions of the side bar extensions 24 is an upper transversely extending socket plate 25 and a lower transversely extending plate 26, the plates 25 and 26 being vertically spaced from each other and disposed in parallel relationship, as illustrated in FIG. 1. The end portions of plates 25 and 26 are respectively welded or otherwise secured to the upper surfaces and lower surfaces of the side bar extensions 24.

Received between the plates 25 and 26 is a straight rigid tool bar 30 which, in cross-section, includes a square or rectangular, hollow, tubular member having an upper panel 30a, a pair of opposed side panels 30b, and a lower panel 30c, connected by their edges to form the square or rectangle, in cross-section.

Figure 7:
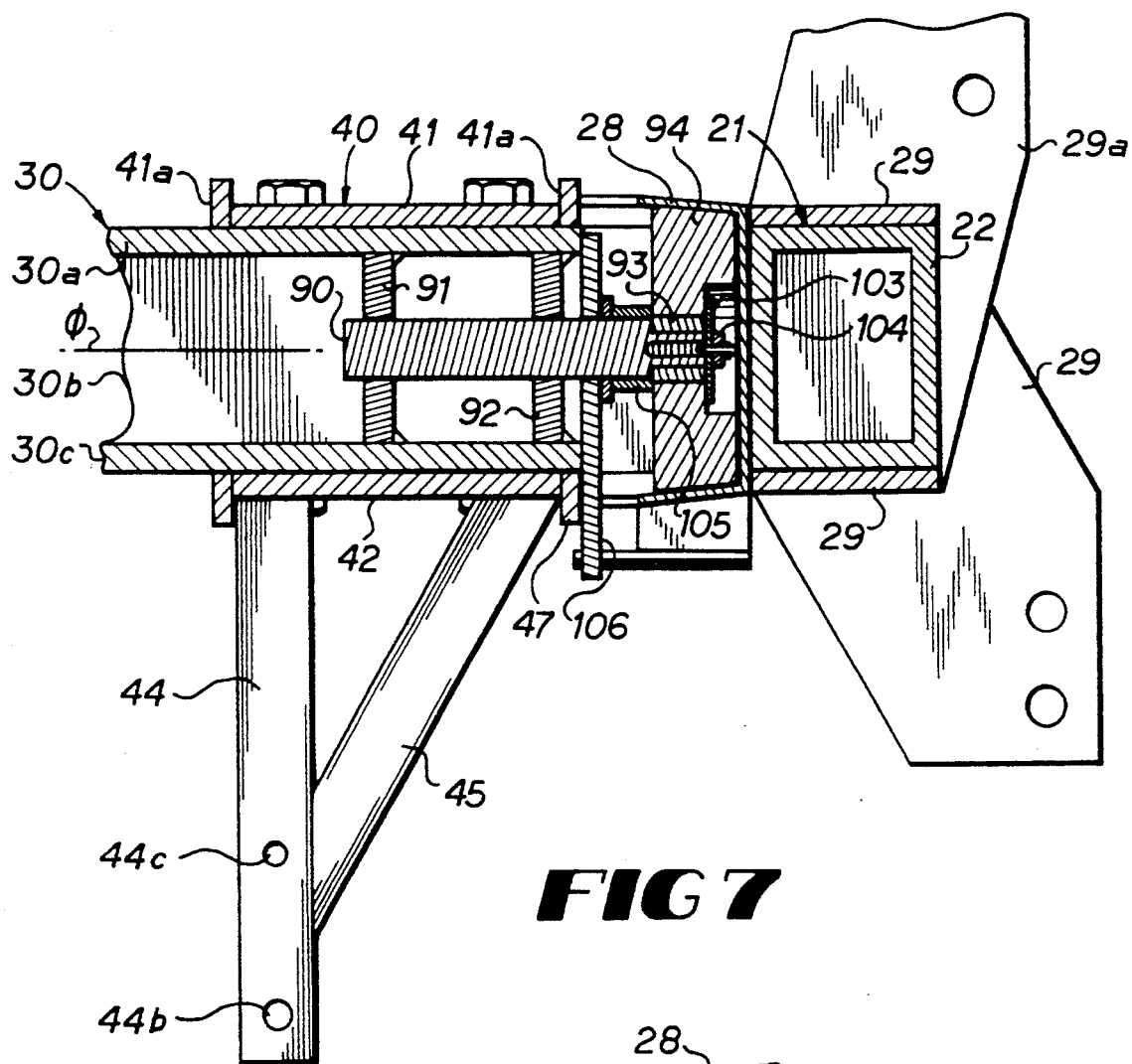
FIG. 7 is an enlarged vertical sectional view of the main frame, a portion of the front moldboard assembly and, the forward portion of the tool bar of the plow depicted in FIG. 1.

The main frame 21 has an arcuate track or guide channel 28 which is received between the side bars 23. In cross-section, this arcuate track 28 is channel-shaped; however the opposed upper and lower sides diverge rearwardly, i.e., from the web of the track as best seen in FIG. 7. Fillets 29 fill in the forward corner portions of the frame 21 and are secured to the forward surface of the arcuate track 28.

The tool bar 30 is a straight bar having a longitudinal axis $\phi$. Spaced moldboard assemblies are suspended from bar 30, as depicted in FIG. 1. Each moldboard assembly includes a clamp and shank member 40 which comprises a pair of opposed plates, namely, a top plate 41 and a bottom plate 42 received respectively against the upper panel 30a and the lower panel 30c. Bolts 43, which pass between the two plates and outwardly of the side panels 30b, connect the two plates together to form a clamp. Protruding downwardly from the lower plate 42 of most of the clamps is a straight vertical shank 44 which is braced by an angling brace 45.

The shank 44 of the clamp and shank member 40 supports a single moldboard 46. This moldboard 46 or 246 is a rectangular arcuate member which is concaved about a transverse horizontal axis forwardly of that particular moldboard. This transverse axis is normal to the upright plane of the longitudinal axis $\phi$ of bar 30. Each moldboard 46 or 246 is identical in construction and has a removable cover or front plate 47.

Such moldboards 46 and 246 are each attached to the shank 44 or 244, as the case may be, by a pivot pin 44a which passes through the hole 44b at the bottom portion of shank 44. Similarly a shear pin (not shown) passes through a selected hole 44d in the brace of the moldboard and thence through a hole 44c of the shank 44. When the shear pin shears, the moldboard 46 or 246 can swing rearwardly. The moldboard 46 or 246 is also provided with a straight lower edge 46a which extends horizontally from one point 46b to the other point 46b of the plow.

The moldboard 46 protrudes from both sides of the tool bar 30 by an equal amount and is non-rotational about a vertical axis of shank 44 or 244.

When the tool bar 30 is swung to the right, the left hand plow points 46b point forwardly and dig into the ground for cutting action and vice-versa.

It will be observed in FIGS. 7, 12A, and 12B that each vertically disposed shank 44 is mounted by its proximal end centrally on the bottom surface of plate 42 and adjacent to the rear edge of that plate 42. Thus, the brace 45 is primarily under tension from the lower portion of the shank 44, rather than compression, as the plow operates. On the other hand, the clamp and shank assembly 40 can be removed from the tool bar 30 and rotated 180° and again installed on the tool bar 30 so that when the moldboard 46 is mounted on the shank 44 and the plow operated, it will apply compression to brace 45. By such an arrangement, the spacing between adjacent moldboards can be varied, not only by loosening the bolts 43 and sliding the clamp and shank assemblies 40 forwardly or rearwardly on the tool bar 30, but can also be altered by simply reversing the position of the assembly 40 on the tool bar 30. Normally an equal spacing is maintained between adjacent moldboards 46 and 246.

Welded to the forward and rear edges of the plates 41 and 42, respectively, are crescent-shaped guide elements 41a which partially encompass the tool bar 30 so as to prevent lateral movement of the plates 41 and 42.

Figure 10:
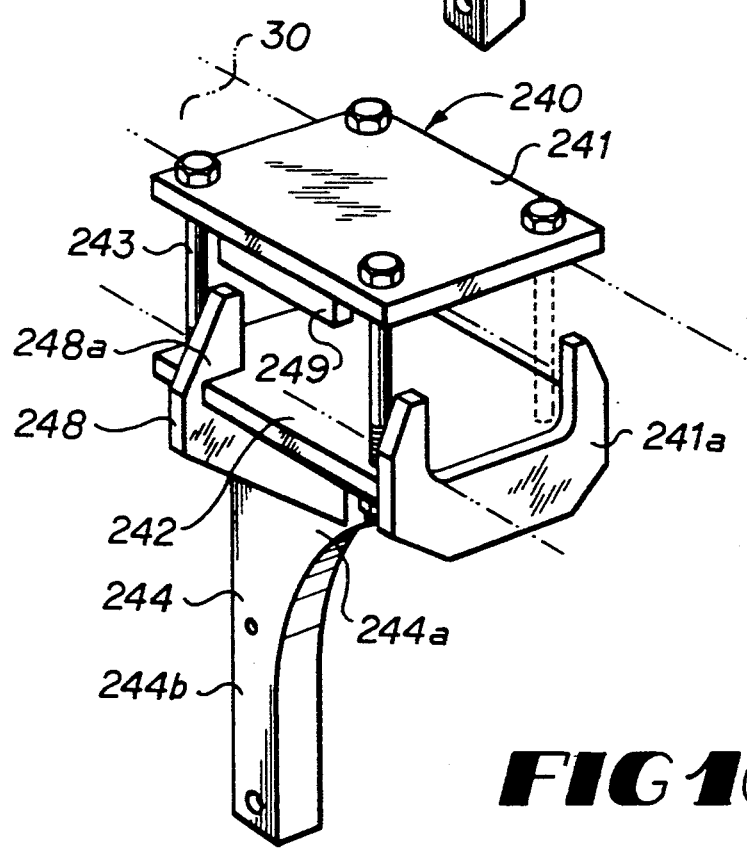
FIG. 10 is an enlarged perspective view of a clamp and shank of one of the moldboard assemblies of the plow.

In FIGS. 10, 12A, and 12B a modified form of clamp and shank assembly 240 is provided. This has the opposed plates 241 and 242 which correspond generally to the plates 41 and 42, the plates 241 and 242 being connected by bolts 243 in the same manner as the plates 40 and 41 are connected by bolts 43. Furthermore, there is a crescent-shaped guide 241a at the rear of plate 243 for arresting lateral movement of the shank and clamp assembly 240 on the tool bar 30. This shank and clamp assembly 240 is uniquely suited for forming the centralmost support for the centralmost moldboard 246. This shank assembly 240 is provided with a dogleg-type shank 244 which has a proximal end or upper base 244a which is secured to the lower plate 242 and a shank 244b which is offset forwardly of the base 244a so that when the moldboard 246 (seen in FIG. 1) is mounted on the shank 244, the moldboard is offset forwardly of the clamp formed by the plates 241 and 242. Thus, the moldboard 246 is positioned immediately below the plate 26 and essentially centrally of the axis α, when the assemblies 40, 240 are arranged along the tool bar 30 in the fashion illustrated in FIG. 12A.

The FIG. 12A spacing of the assemblies 40, 240 is for a plow arrangement which will be pulled by a tractor manufactured in the United States and having a wheel base or wheel spacing of seventy-two inches (72").

In FIG. 12A the forwardmost clamp and shank assembly 40 is positioned as far forward as practical and the central moldboard 246 which is supported by clamp and shank assembly 240 is beneath the axis α and the ball 61. When it is desired to arrange the spacing of the moldboards 46, 246 for use with a tractor 10 having a smaller wheel base, i.e., a spacing of essentially sixty-six inches (66"), rather than seventy-two inches (72"), the clamps of the clamp and shank assemblies 40 are rearranged so as to move the shanks 44 and 244 rearwardly to positions shown in FIG. 12B. This is quite easily accomplished by simply loosening the bolts 43 and sliding the assemblies rearwardly and then retightening the boles 43. With the FIG. 12B arrangement, the furrow provided by the frontmost moldboard will be offset inwardly of the path of travel of the tractor 10 as compared to the moldboard settings achieved when the shank assemblies 40 and 240 are positioned as shown in FIG. 12A.

The shank 244, as shown in FIG. 10, includes side brackets 248 which reinforce the base 244a of the shank 244 so as to resist bending of the shank, the braces such as brace 248 including upstanding elements 248a which protrude above the plate 243 and prevent lateral movement of the shank assembly 240. It is also to be noted that the top plate 241 is provided with downwardly protruding side guides 249 which are disposed on opposite sides of the plate 241 so as to arrest any appreciable lateral movement of the plate on the bar 30. The moldboards 46 and 246 should in both instances be arranged so that one moldboard overlaps about one half the path of the next moldboard.

An extension 130 of the tool bar 30 is secured by abutting plates 131 at the rear of bar 30. This extension, if utilized, can carry an additional pair of the spaced assemblies 40. In the rearmost assembly 40 the top plate 41 carries an upstanding stop mender 134 which is provided with a threaded crank 135 the inner end portion of which arrests upward movement of a rearwardly extending boom 136 carried on the upper surface of the extension 130. The threaded crank 135 prescribes how far the central portion of the boom 136 may move upwardly.

Figure 5:
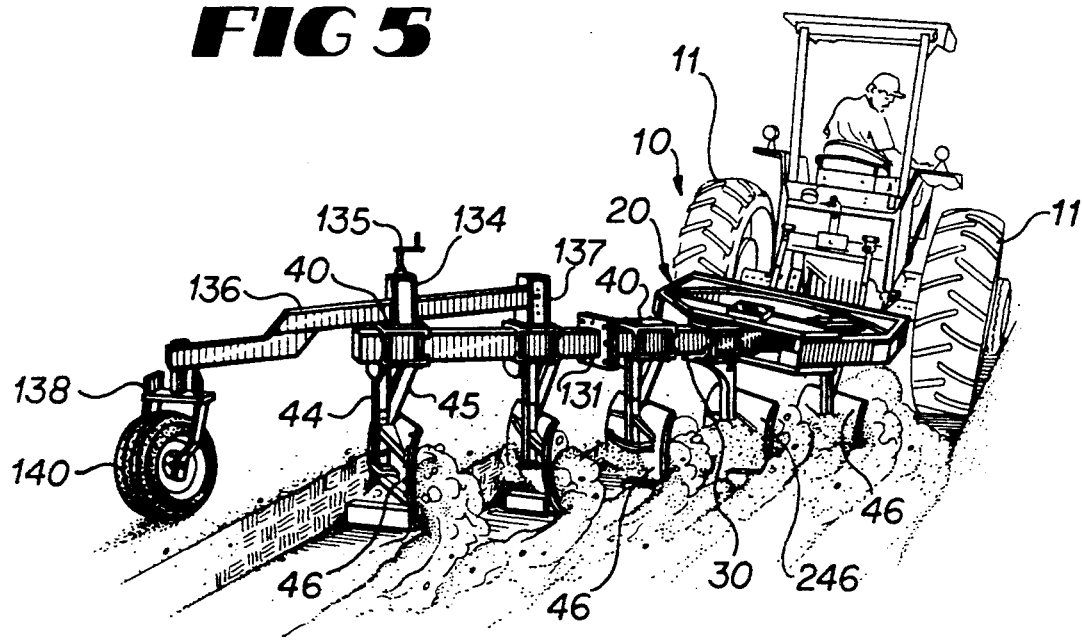
FIG. 5 is a perspective rear view of the plow and tractor shown in FIG. 1 as the plow is being towed by a tractor for plowing the ground.

At the forward end portion of the boom 136 there is an upstanding inverted U-shaped bracket 137 into which the forward end portion of the boom 136 is pivotally mounted. This bracket 137 is mounted on a top plate 41 of an assembly 40 located forwardly of the rearmost assembly 40, as seen in FIGS. 1 and 5.

The rear end portion of the boom 136 carries a tail wheel yoke 138 which, in turn, rotatably supports a rear wheel or tail wheel 140. The yoke 138 is provided with an upstanding pivot shaft 141 which protrudes up through and is journalled by the end portion of the boom 136 and which permits the yoke 138 to pivot about a vertical axis as the wheel 140 rotates about a horizontal axis. Slops 142 limit the pivoting action of the yoke 138, whereby the rear wheel or tail wheel 140 will ride upon the ground and automatically align itself for tracking along a longitudinal path of travel parallel to the path of the tractor 10 which pulls the plow 20.

According to the present invention, a tool bar tilt and pivot assembly is provided in the central portion of the plates 25 and 26, this tool bar tilt and pivot assembly being illustrated more specifically in FIGS. 2A, 2B, 3, and 4. This tool bar tilt and pivot assembly or swivel assembly includes a central, generally upright, cylindrical steel, swivel shaft 60 which is integrally connected by its upper portion, to a generally spherical ball 61 which is received in an appropriate socket formed by opposed concaved complimentary socket members 62 and 63. The socket members 62 and 63 are rectangular blocks, the common edges of which abut each other to form the circular journal socket defined by the spherical semi-circular, concaved, socket surfaces, such as surface 64 so as to encompass from opposite sides and support the rounded ball 61. Bolts 65 hold the members 62 and 63 together. The socket members 62 and 63 are bolted in place on the upper surface of the upper plate 25 by means of bolts 66. Below the ball 61, the shaft 60 hangs pendant through a hole 67 in the upper plate 25.

Below and vertically aligned with the hole 67 in upper plate 25 is a triangularly-shaped hole or opening 68 whose dimensions are substantially greater that the diameter of the shaft 60.

The shaft 60 has an upright axis $\alpha$ and is sufficiently long that its lower end portion protrudes into and remains confined by the straight camming surfaces 68a, 68b, and 68c defining this triangularly-shaped hole or opening 68. Thus, the central swivel shaft 60 is free to swing in any direction and rotate about axis $\alpha$ since it is supported solely by the socket members 62 and 63; however, the extent of the swing of the swivel shaft 60 is confined by the surfaces 68a, 68b, and 68c defining opening 68, as will explained, hereinafter.

Figure 6:
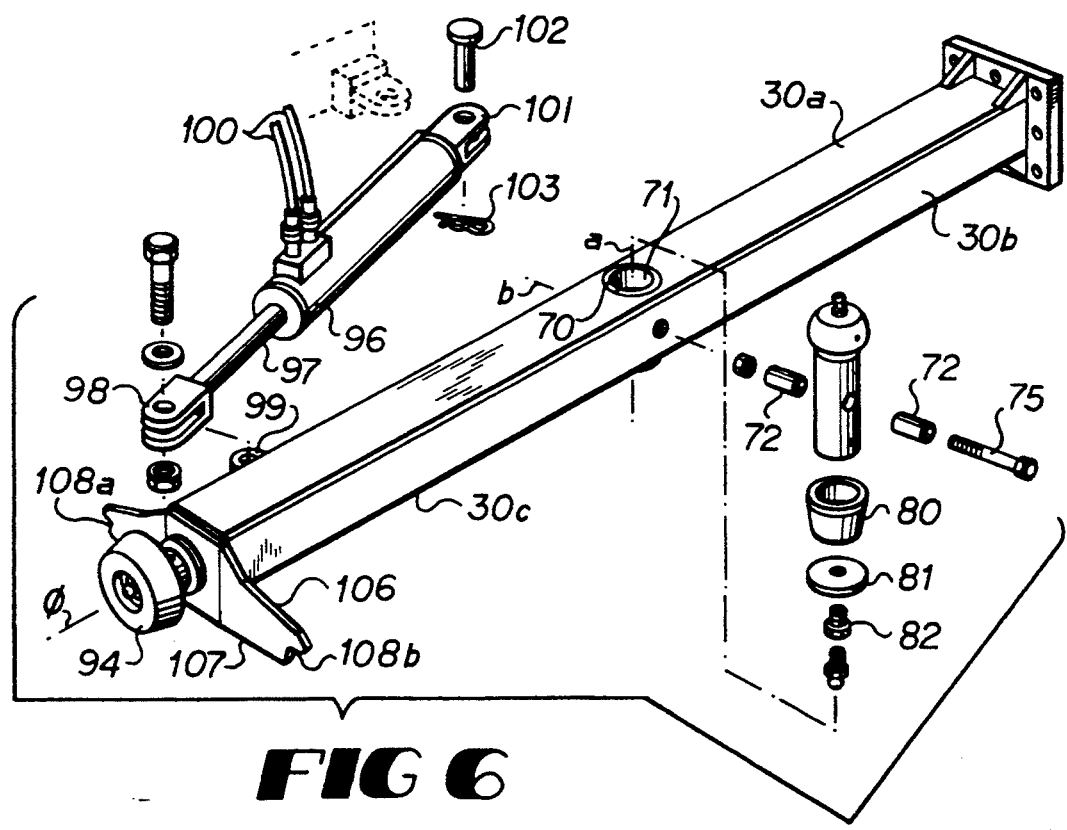
FIG. 6 is an exploded perspective view of the tool bar, the hydraulic cylinder and the tilting assembly of the plow shown in FIG. 1.

It will be observed in FIG. 6 that the central portion of the tool bar 30 is provided with a vertical hole 70 in panels 30a and 30c and into which is inserted a hollow cylindrical bushing 71, the bushing 71 being welded in place in the central portion of the tool bar 30 so as to define a generally vertical cylindrical opening along axis $\alpha$ and through which the shaft 60 passes, when the swivel shaft is mounted within the upper and lower plates 25 and 26. Bushing journals shaft 60 for rotation about upright axis $\alpha$.

The panels 30b are provided with opposed transversely extending bearings 72 which are aligned with each other along a transverse central axis $\beta$ through swivel shaft 60. A bolt or pin 75 passed through and is journalled by these aligned bearings 72 in shaft 60. Shaft 75 thus has transverse axis $\beta$ and forms trunnions which support the tool bar 30 for pivoting.

The lower end portion of the swivel shaft 60 protrudes below and through the triangular-shaped opening 68 and is provided at its lower portion with a removable roller or rotatable bushing 80, the outer surface of which is tapered downwardly and inwardly. This roller 80 is held in place against the lower surface of bushing 71 by an annular retaining plate 81 which, in turn, receives an inverted hollow cap screw 82 which is screwed into an internally threaded opening in the bottom portion of the swivel shaft 60. The hollow screw 82, in turn, is provided with an enlarged head 84 provided with a grease fitting 85. The cap screw 82 protrudes through the central portion of the retaining plate 81 so as to urge the retaining plate 81 against the lower surface of the bushing or roller 80 and so as to removably retain this roller 80 in place. When the swivel shaft 60 swings in any direction, the roller 80 engages the surfaces 68a, 68b, and 68c, as the case may be.

The grease fitting 85 communicates with a channel 86 in the lower portion of the swivel shaft 60 so as to supply grease for lubricating the freely rotatable roller 80.

In like fashion, a grease fitting 87 is provided at the upper flat end of the ball 61 and communicates with a grease channel 88 for supplying grease between outer periphery of the swivel head and the conforming surface of the socket members 62 and 63.

Figure 2A:
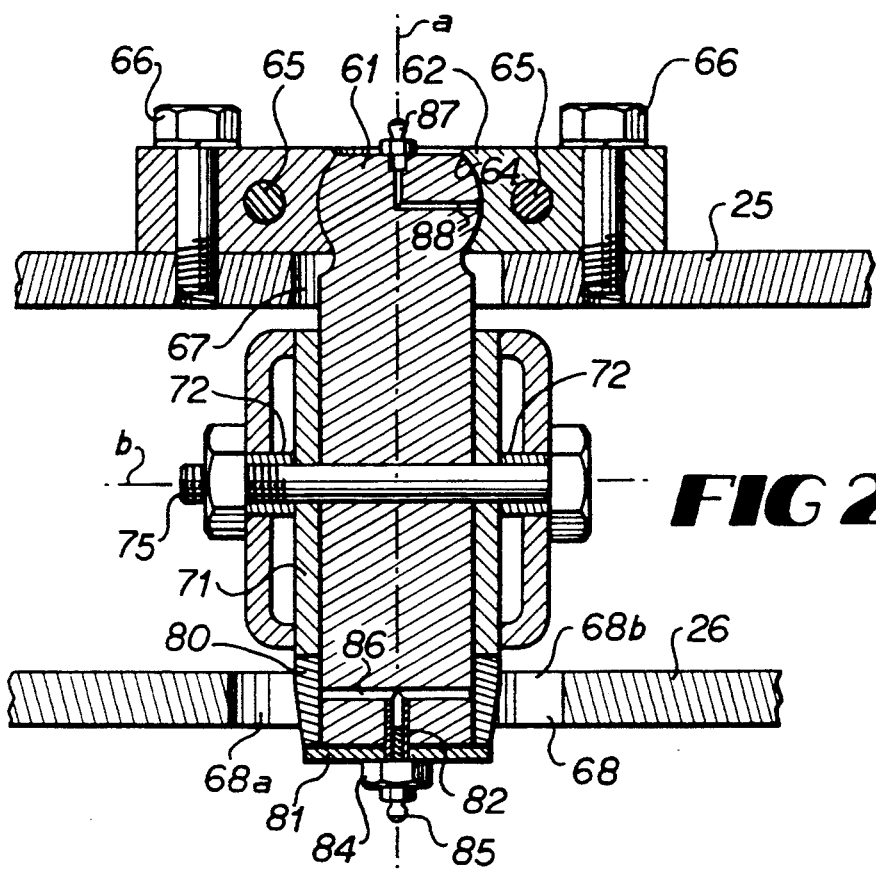
FIG. 2A is an enlarged fragmentary vertical sectional view of a portion of the plow shown in FIG. 1 and showing the tool bar in a neutral position with respect to the main frame of the plow.
Figure 2B:
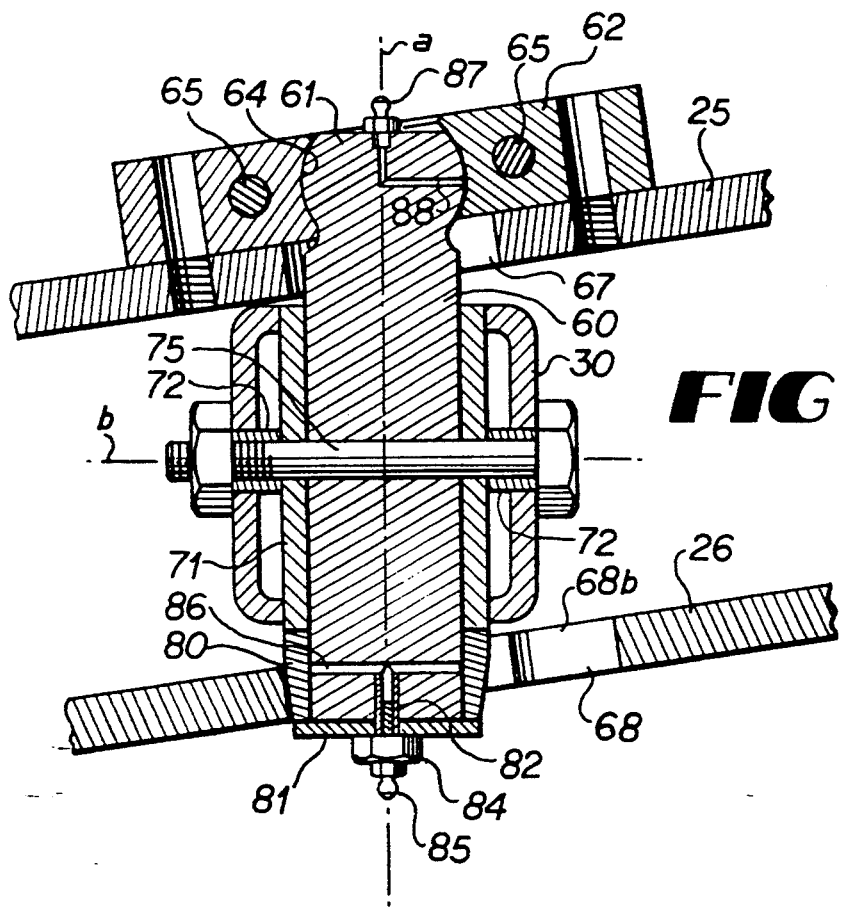
FIG. 2B is a vertical sectional view similar to FIG. 2A and showing the main frame in a position tilted from the horizontal whereby the tool bar is in a tilted position with respect to the main frame.
Figure 3:
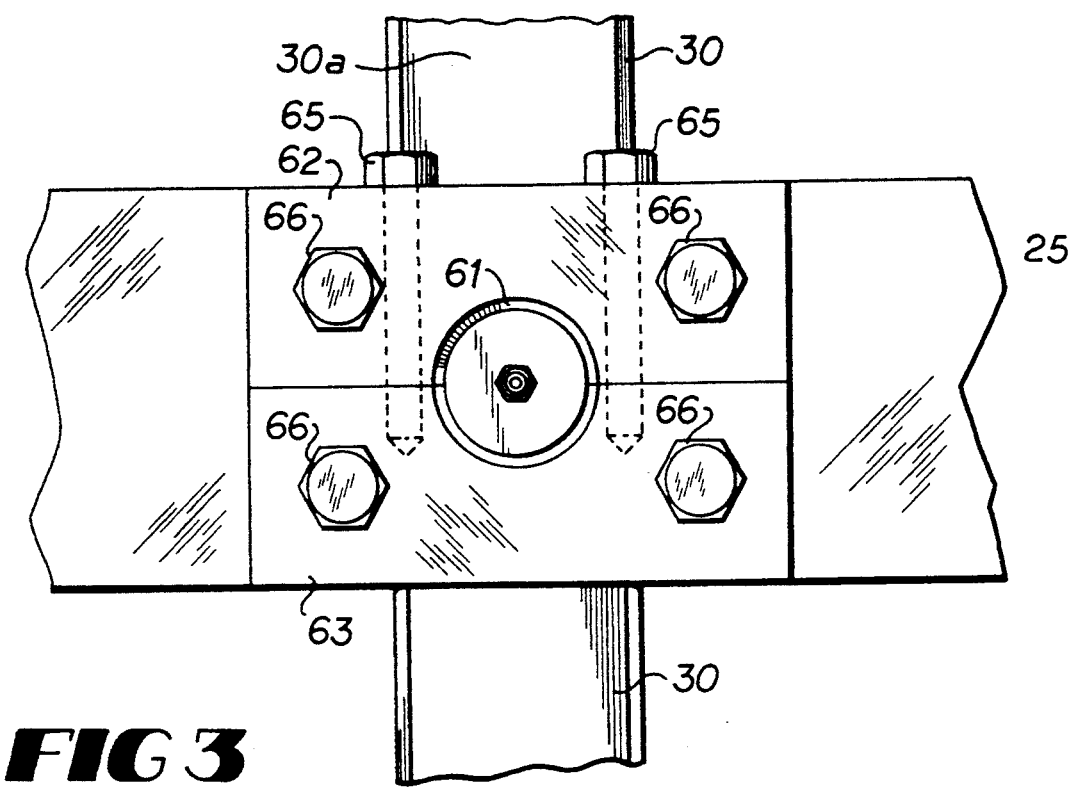
FIG. 3 is an enlarged fragmentary plan view of a portion the plow shown in FIG. 2A.

The purpose of the tool bar tilt and pivot assembly is to maintain the tool bar 30 in a horizontal pendant position, as the main frame 20 is tilted, as depicted, for example, in FIG. 2B. The slope of the periphery of roller 80 and the thickness of the roller 80 determines the extent of swinging of the shaft 60 since the shaft 60 will swing until the tapered surface of the periphery of the roller 80 engages a portion of the wall 68a, 68b, 68c defining the lower opening 68. There are several different sizes of roller 80 which can be used and will selectively permit a tilting of 7°, 8°, or 9° and by simply removing the retaining plate and bolt 82, one wheel 80 can be substituted for another. Thus, when a deep furrow is to be plowed, a 9°, relatively thin roller 80 should be used since it would permit more tilting in order to level the tool bar 30.

The deeper the furrows to be plowed are to be, the thinner should be the wheel 80, thereby permitting additional swing of the shaft 60 from the vertical of between a minimum of about 5° to a maximum of about 10°.

Figure 8:
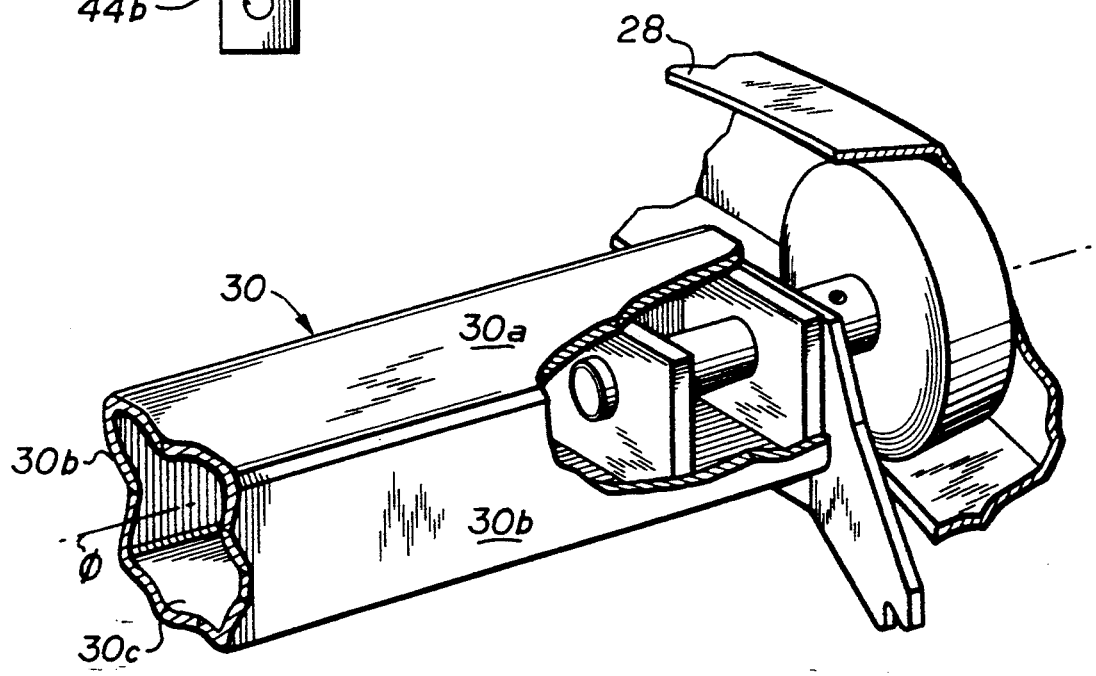
FIG. 8 is an enlarged partially broken away perspective view of a part of that portion of the plow depicted in FIG. 7.

Referring now to FIGS. 7 and 8, it will be seen that at the forward end portion of the tool bar 30 there is provided a central longitudinally extending stub shaft 90 which is mounted firmly within the front portion of the tool bar 30 and protrude, therefrom. In more detail, the inner portion of the shaft 90 protrudes through and is welded to a pair of spaced parallel support petitions 91 and 92, the shaft 90 being welded in place, thereto. The petitions 91 and 92 are within the front end portion of the tool bar 30, as depicted in FIG. 7. This leaves the front end portion of the shaft 92 to protrude forwardly beyond the end of the tool bar 30. The end of this shaft 30 is of reduced diameter and is provided with a bushing 93 which carries a guide roller 94. The periphery of the roller 94 has a taper which corresponds generally to the taper of the guide rail 28. The roller 94 provides support for the end of the tool bar 30, regardless of the angular position of this tool bar 30 and also arrests forward axial movement of the tool bar 30 along axis $\phi$, the longitudinal axis of bar 30. The tapered roller 94, however, permits the tool bar 30 to shift in an axial direction along the longitudinal axis $\phi$ of the tool bar 30, while tool bar 30 pivots slightly about axis b seen in FIGS. 2A and 2B.

For swinging the tool bar 30 about its upright axis $\alpha$, as defined by the shaft 60 a hydraulic double-acting cylinder 96 (seen best in FIG. 6) is provided, this cylinder 96 having a piston rod 97 which is pivotally mounted by a clevis 98 to an eyelet 99 on one side of the forward portion of the tool bar 30. The hydraulic cylinder 96 is operated by hydraulic fluid through flexible hoses 100 which are connected appropriately to the tractor 10.

The other end of the cylinder 96 is mounted by brackets 101 appropriately to the main frame 20 adjacent to its rear portion. A clevis pin 102 and cotter key 103 removably retain the brackets 101 in pivotal relationship on frame 20.

The function of the piston 97 is to cause the tool bar 30 to swing to the right when the piston 97 is retracted and to the left when the piston 97 is extended. The usual swing of the tool bar 30 is from about 38° to 40° to the right of the longitudinal centerline of the frame 21 to about 38° to 40° to the left of the centerline of the frame 21.

As an option and to aid the piston 96 in holding the tool bar 30 in one extreme angular position or the other, I have provided a detent or latch plate 106, fixed on the end of tool bar 30 and tilted when the bar 593 30 is tilted. The latch plate 106 is in spaced relationship to wheel 94, so that it does not interfere with the movement of wheel 94 in its arcuate track 28 or toward and away from that track 28.

The roller 94 is retained on shaft 90 by a washer 103 and a screw 104. A thrust bearing 15 between detent or latch plate 106 and roller 94 cooperates with washer 103 to hold roller 94 in place on shaft 90.

Figure 11A:
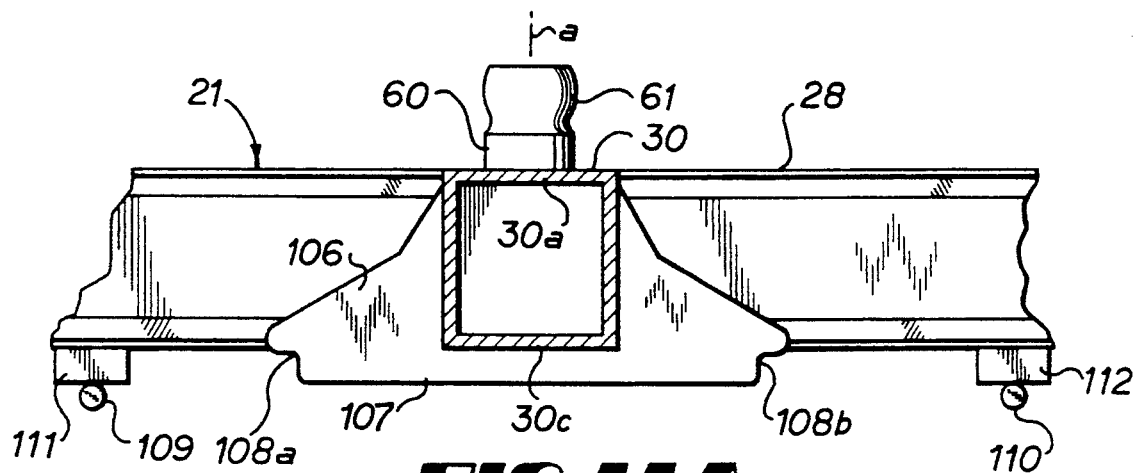
FIG. 11A is an enlarged fragmentary vertical sectional view of a portion of the tool bar containing the detent for automatically locking the tool bar in a rotated position, the tool bar being shown in its neutral position.
Figure 11B:
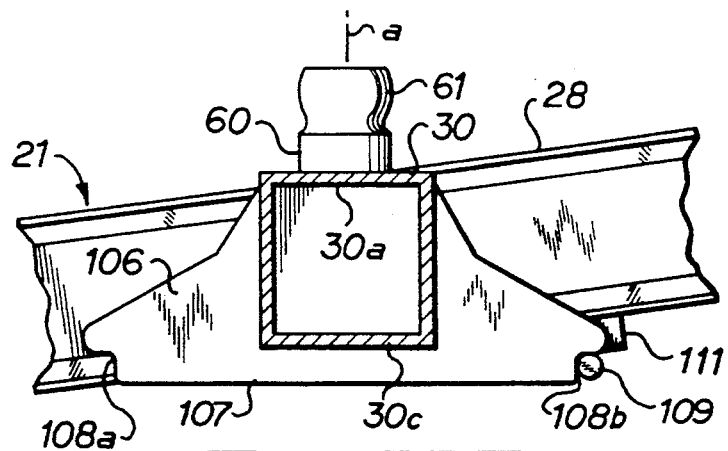
FIG. 11B is a view similar to FIG. 11A but showing the tool bar in one extreme angular position and the detent being latched.
Figure 11C:
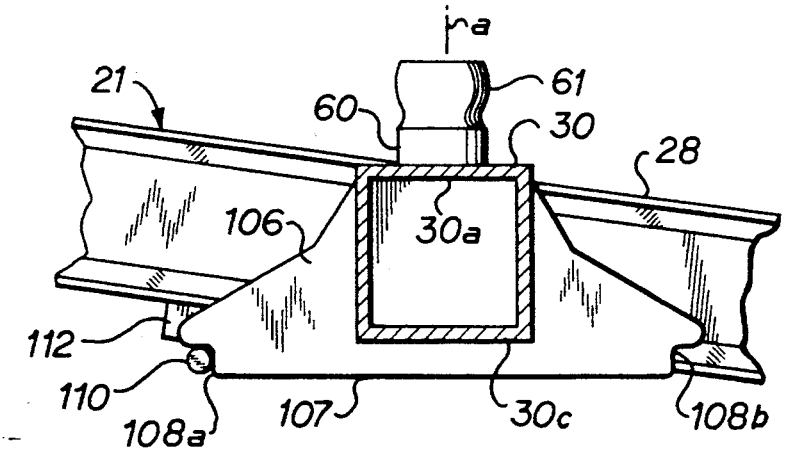
FIG. 11C is a view similar to FIGS. 11A and 11B but showing the tool bar in its other extreme position with the detent being latched.

The detent or latch plate 106 is fixed to the front end of tool bar 30 and, as seen best in FIGS. 11A, 11B, and 11C, is generally triangular in shape. Plate 106 is bent to conform to the shape of track 28 and remains adjacent to the track 28 as the tool bar 30 swings from one side to the other of frame 21. The lower edge 107 of plate 106 is parallel to the panels 30*a* and 30*c* and remains horizontal when the plow 20 is lifted. The opposed ends of the plate 106 respectively have lower opposed corner notches 108*a* and 108*b* which are adapted to cooperate with detent pins 109 and 110 for latching the pivoted tool bar 30 in either of its extreme angular positions.

In more detail, the detent pins 109 and 110 are spaced apart about 70° along the arc of track 28, being disposed between the path of travel of the horizontal detent plate 106. Fixed pins 109 and 110 protrude rearwardly from support blocks 111 and 112 on track 28. Thus, when the plow is lifted and the tractor 10 on level ground, the lower edge 107 of the plate 106 will be horizontal and thus pass over either pin 109 or 110.

When, however, the tool bar 30 is fully pivoted to be angled to the left and the frame 21 is then tilted to the left as tractor wheel 11 enters a furrow, the tool bar 30 will be pivoted to an angular position with respect to frame 20, and, hence, the plate 106 will latch in place so that pin 109 is received in the downwardly and outwardly opening notch 108*b*, as shown in FIG. 11B. If, however the frame 20 is lifted, the tool bar 30 is shifted fully to the right, while parallel with the frame 21, and then the frame 21 is tilted to the right, the plate 106, remains horizontal so as to be angular with respect to frame 20 and will latch with pin 110 in notch 108*a*, as shown in FIG. 11C. Once latched, the plate 106 remains latched so long as the tractor 10 is in the furrow tilting the frame 21 to the right or left, as the case may be. Usually latch plate 106 is not necessary since the piston and cylinder 96 have sufficient hydraulic pressure to hold the tool bar 30 in either angular position.

Figure 9:
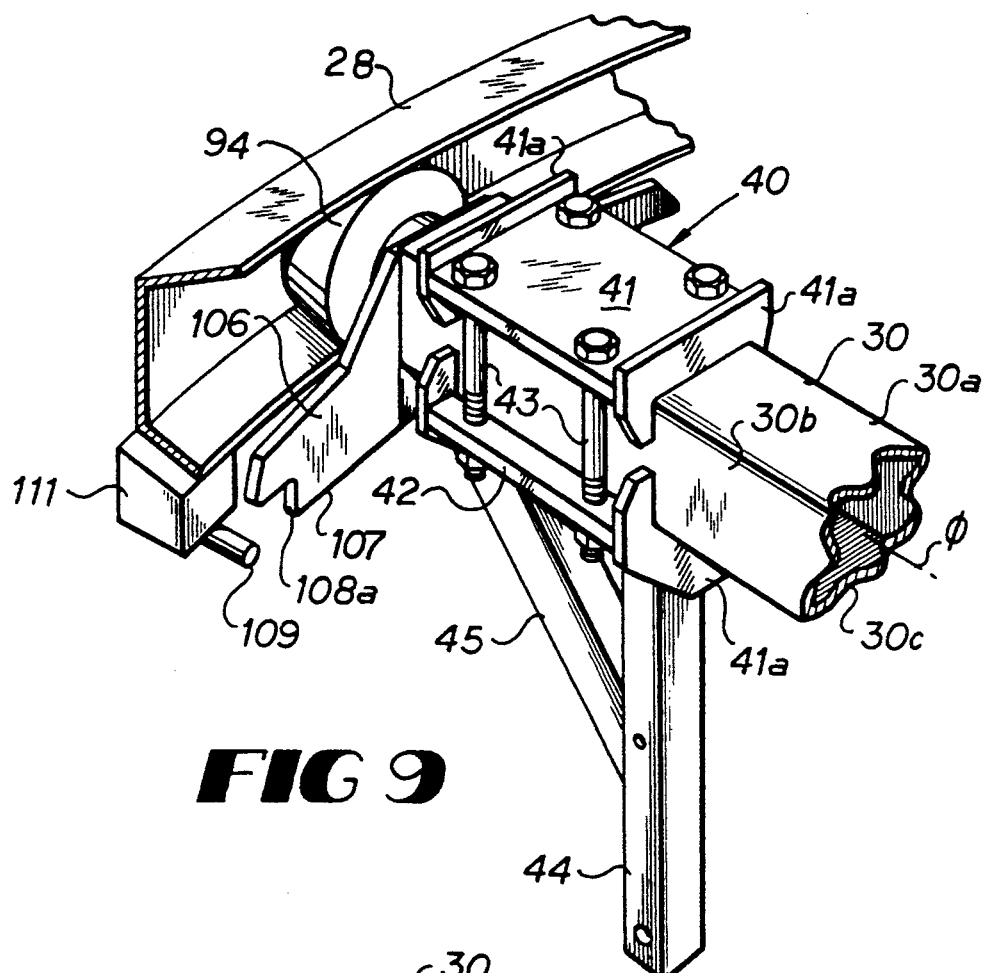
FIG. 9 is an enlarged fragmentary perspective view of the elements depicted in FIG. 7.

In operation, the plow 20, which is hitched to the tractor 10, is lifted by actuation of the side hitches 12 and central hitch 13 so that the main frame 20 is raised and inclined forwardly. This lifts the moldboards 46 out of the ground and causes the tool bar 30 and the moldboards 46 to swing by gravity to a neutral upright position. The forward tilt of the main frame 21, about a transverse axis urges the tool bar 30 and the moldboards 46 by gravity in a forwardly direction, with respect to the main frame 20. Since the tapered guide wheel or roller 94 is loosely received in the tapered track 28, the tool bar 30 can shift slightly, in a forward or rearward direction, permitting the tool bar 30 and wheel 94 to travel a short distance toward and away from track 28. Thus, with the frame 20 lifted, and inclined, the tool bar 30 and the wheel 94 move forwardly by gravity until the wheel 94 is fully received in track 28, in the position shown in FIGS. 7, 8, and 9.

Since the transverse pivot pin or shaft 75 seen in FIG. 2A and FIG. 2B, is disposed radially or transversely to axis a, the upright pendulum shaft 60 can pivot about a transverse or radial axis b as it moves forwardly.

Figure 4:
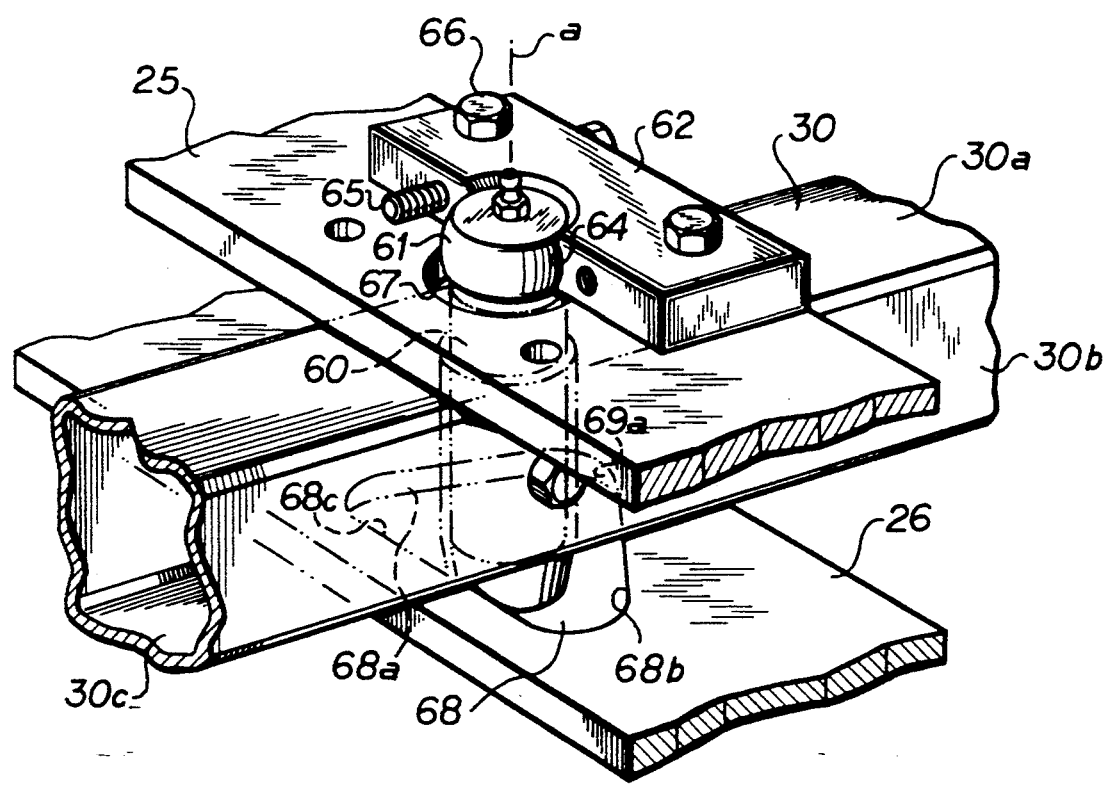
FIG. 4 is a fragmentary perspective view of that portion of the plow shown in FIG. 3, a part of the structure being shown in broken lines and a part being removed for the purposes of clarity.

The lower end portion of upright pendulum shaft 60 thus carries roller 80 along one of the forwardly tapering camming surfaces 68*a* or 68*b*, as the case may be, until roller 80 is received in the forward pocket 69*a* shown in broken lines in FIG. 4, at the apex of surfaces 68*a* and 68*b*. At this particular time the tool bar 30 is in its neutral position as seen in FIG. 2A and FIG. 11A and the moldboards 46 and 246 are parallel to raised main frame 21.

With the tool bar 30 in neutral, the latch or detent plate 106 is pivoted to a horizontal position, as shown in FIG. 11A and its bottom edge 107 is about parallel to the guide track 28. Thus, plate 106 can travel over detent pin 109 and 110, to be latched when the tool bar 20 has swung from one extreme position, i.e., from extending angularly forward and to one side of frame 21 to extending forwardly and to the other side of passing over both pin 109 and pin 110 to then be disposed at about 38° to about 40° to the longitudinal axis of the main frame into a locked position as shown in FIG. 11B or 11C, as the case may be.

It will be obvious to those skilled in the art that many variations may be made in the embodiment here showing the best mode contemplated by the inventor for carrying out this invention, without departing from the scope thereof as defined by the appended claims.

I claim:

1. A bidirectional plow comprising:
   (a) a main frame;
   (b) means for hitching said main frame to a tractor for being towed along a longitudinal path of travel by said tractor and for being lifted by said tractor and for tilting by said tractor when said tractor is tilted;
   (c) a tool bar having a longitudinal axis and a central portion, a forward portion and a rear portion, said tool bar having its forward portion within said main frame and its rear portion protruding rearwardly from said main frame;
   (d) rotationally rigid moldboards attached to said tool bar, said moldboards being disposed transversely of said tool bar and protruding from both sides of said tool bar;
   (e) a rigid upstanding shaft on the central portion of said tool bar; and
   (f) pivot means on the upper portion of said shaft and carried by an intermediate portion of said frame for permitting said tool bar to be pivoted with respect to said frame when said frame has been lifted and so that the forward portion of said tool bar may swing from one side of said frame to the other side of said frame in changing positions and also for permitting said tool bar to pivot about its longitudinal axis from one angled position to another angled position for thereby inclining said moldboards and said tool bar with respect to said main frame for thereby also positioning said moldboards in horizontal positions with respect to the ground when said tool bar has been pivoted to either of its positions and said main frame has thereafter been lowered for plowing.

2. A bidirectional moldboard plow comprising a main frame for being towed by a tractor along a path of travel with the main frame remaining about parallel to the transverse axis of said tractor and so that it will be tilted to one side of the path of travel when one wheel of the tractor is in a furrow on one side of the tractor and so that it will be tilted toward the other side of the path of travel when the other wheel of the tractor is in another furrow, a tool bar pivotally carried by said frame for being swung from one extreme position where it is angling forwardly and to one side of the path of travel, to another extreme position where it is angling forwardly and to the other side of said path of travel; and means for rotating said tool bar about a longitudinal axis of said tool bar for disposing said moldboards parallel to the ground when said main frame is tilted and said tool bar is rotated with respect to said main frame, including a latch plate having opposed end notches, said latch plate being fixed on the end portion of said tool bar for pivoting with said tool bar as said tool bar is swung from one extreme position to another, and spaced pins adjacent to and below the path of travel of said plate for respectively receiving said notches on said pins after said tool bar is in one or the other of its extreme positions and said tool bar is pivoted about the longitudinal axis of said tool bar.

3. A bidirectional plow comprising:
   (a) a main frame;
   (b) hitch means for hitching said main frame to a tractor for being towed by said tractor along a path of travel and for being tilted sidewise with said tractor to one side of the path of travel or the other side of the path of travel when the tractor is tilted because one wheel of the tractor is in a previously plowed furrow, said hitch means also permitting said tractor to lift said main frame to an inclined position with respect to the ground;
   (c) an elongated tool bar having a front end, a rear end, and a central portion;
   (d) swivel means between said main frame and said central portion of said tool bar for suspending said tool bar from said main frame;
   (e) a plurality of moldboards connected to and suspended below said tool bar, said moldboards being rotationally rigid about a vertical axis with respect to said tool bar and being aligned with each other and being spaced from each other along the length of said tool bar, said moldboards each having generally straight lower edges extending transversely of the length of said tool bar so that each moldboard protrudes from both sides of said tool bar and said edges are disposed in a common plane, said moldboards having points at the respective ends of said straight lower edges, said moldboards each having a curved concaved front extending upwardly and rearwardly from said straight lower edge;
   (f) means connected between said main frame and said tool bar for pivoting said tool bar in one direction or another direction about said swivel means so as to position said tool bar in a first angular position in which all of said moldboards are angularly disposed with respect to the path of travel of said main frame for engaging the ground and for pitching the soil to one side of said frame and so as to position said tool bar in a second angular position in which all of said moldboards are angularly disposed with respect to the path of travel and said main frame for engaging the ground and for pitching the soil to the other side of said frame;
   (g) the weight of said moldboards being equally distributed on opposite sides of said tool bar so that, when said tool bar is lifted, said moldboards are oriented by gravity for disposing said edges of said moldboards about parallel to the ground, regardless of whether said main frame is tilted in one direction or the other by said tractor; and
   (h) said swivel means includes a socket carried by said main frame, a ball confined within said socket and a shaft protruding from said ball and connected to said central portion of said tool bar.

4. The bidirectional plow defined in claim 3 wherein said shaft is fixed by an end to said central portion of said shaft and is perpendicular to said tool bar.

5. A bidirectional plow comprising:
   (a) A main frame;
   (b) hitch means for hitching said main frame to a tractor for being towed by said tractor along a path of travel and for being tilted sidewise with said tractor to one side of the path of travel or the other side of the path of travel when the tractor is tilted because one wheel of the tractor is in a previously plowed furrow, said hitch means also permitting said tractor to lift said main frame to an inclined position with respect to the ground;
   (c) an elongated tool bar having a front end, a rear end, and a central portion;
   (d) swivel means between said main frame and said central portion of said tool bar for suspending said tool bar from said main frame;
   (e) a plurality of moldboards connected to and suspended below said tool barb said moldboards being rotationally rigid about a vertical axis with respect to said tool bar and being aligned with each other and being Spaced from each other along the length of said tool bar, said moldboards each having generally straight lower edges extending transversely of the length of said tool bar so that each moldboard protrudes from both sides of said tool bar and said edges are disposed in a common plane, said moldboards having points at the respective ends of said straight lower edges, said moldboards each having a curved concaved front extending upwardly and rearwardly from said straight lower edge;
   (f) means connected between said main frame and said tool bar for pivoting said tool bar in one direction or another direction about said swivel means so as to position said tool bar in a first angular position in which all of said moldboards are angularly disposed with respect to the path of travel and said main frame for engaging the ground and for pitching the soil to one side of said frame and so as to position said tool bar in a second angular position in which all of said moldboards are angularly disposed with respect to the path of travel and said main frame for engaging the ground and for pitching the soil to the other side of said frame;
   (g) the weight of said moldboards being equally distributed on opposite sides of said tool bar so that, when said tool bar is lifted, said moldboards are oriented by gravity for disposing said edges of said moldboards about parallel to the ground, regardless of whether said main frame is tilted in one direction or the other by said tractor; and
   (h) an arcuate channel shaped rearwardly opening track having opposed upper and lower surfaces mounted on said main frame adjacent to the front end of said tool bar, and guide means on an end of said tool bar for movably protruding into said track so as to permit said guide means to move along said track in an arcuate path when said tool bar is pivoted from one position to the other and also to permit said tool bar to move in a direction toward said track when said main frame is lifted to its incline position by said tractor and move away from said track when said frame is returned to an essentially horizontal position with respect to the ground.

6. The bidirectional plow defined in claim 5 wherein said track includes means at the extremities of said track for arresting further pivoting movement of said tool bar when said tool bar has been positioned horizontally in said first angular position and when said tool bar has been positioned horizontally in said second angular position.

7. The bidirectional plow defined in claim 6 wherein said guide means is a roller having a tapered outer periphery which engages said surfaces.

8. The bidirectional plow defined in claim 7 wherein taper of said outer periphery is from about 5° to about 10° to the axis of said roller.

* * * * *